Jan. 28, 1930.  F. W. HILD  1,745,094
REGULATING DEVICE
Filed Feb. 20, 1926
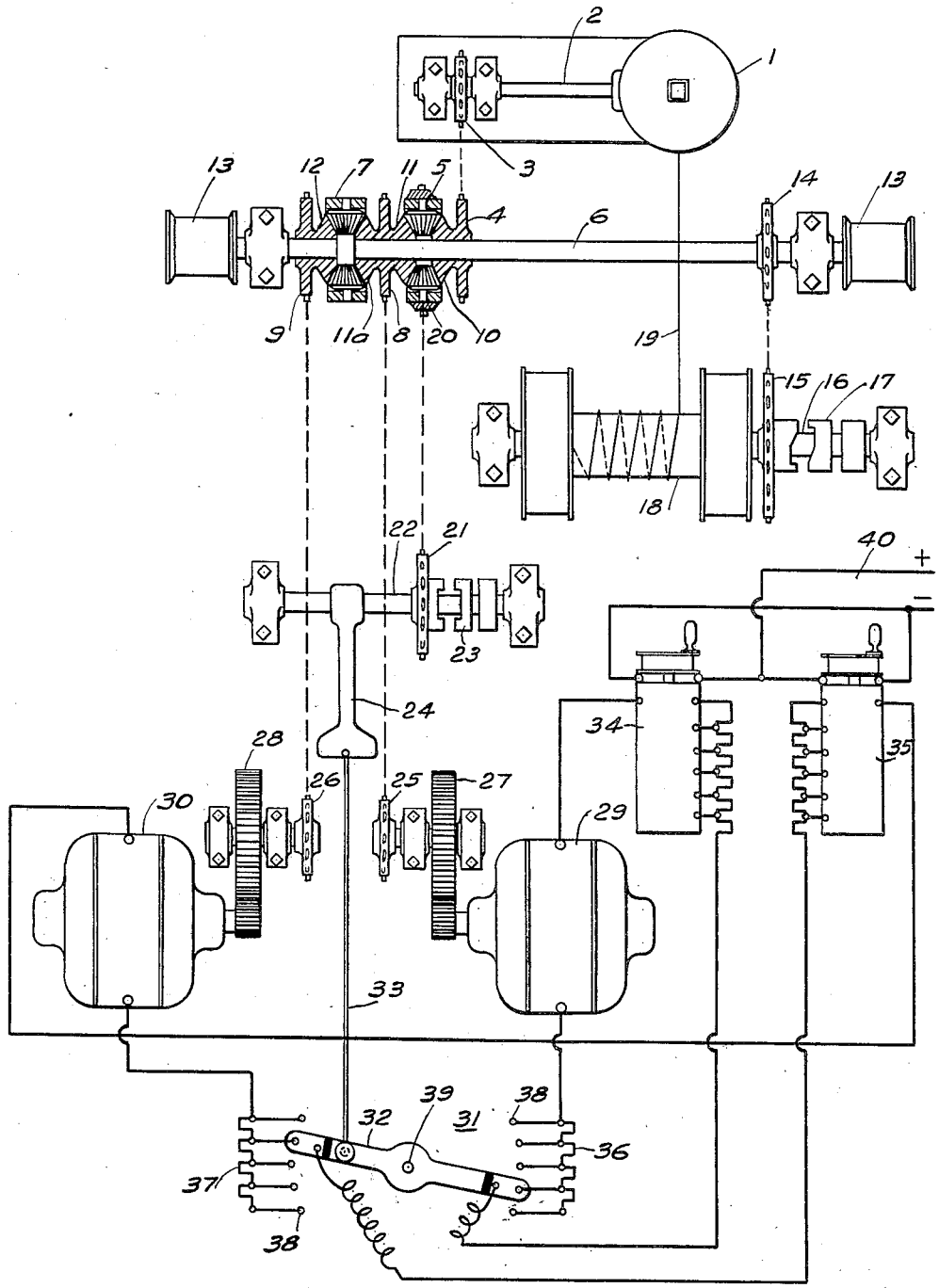
WITNESSES:
E. A. McCloskey
Wm B. Jaspert
INVENTOR
Frederic W. Hild.
BY
Wesley G. Carr
ATTORNEY Patented Jan. 28, 1930

1,745,094

UNITED STATES PATENT OFFICE

FREDERIC W. HILD, OF LOS ANGELES, CALIFORNIA

REGULATING DEVICE

Application filed February 20, 1926. Serial No. 89,611.

My invention relates to regulating devices, more particularly to an earth-boring device for automatically regulating the drilling function of a tool relative to the variations of load on the drill bit in accordance with the various earth formations encountered.

It is among the objects of my invention to provide an earth-boring system, or the like, embodying means for automatically regulating the torque on the drill bit and for regulating the rate of feeding of the drill member relative to the cutting resistance encountered thereby.

Another object of my invention is to provide an earth-boring system of the above-designated character that is adapted to be actuated by a pair of motors and which shall embody means for regulating the speed of rotation thereof in accordance with the torque variations on the drill member.

Another object of my invention is to provide an earth-boring system embodying a torque-regulating device that is responsive to the torque variations of the drill member and which shall be adapted to regulate the operating characteristics of the motors in accordance with such torque variations.

Another object of my invention is to provide an earth-boring system that shall embody simple and mechanically durable cooperating elements so designed and arranged as to facilitate earth-boring operations to a degree not heretofore attained by prior devices.

Another object of my invention is to provide an earth-boring system of the above-designated character which shall embody a plurality of driving motors and means for automatically regulating the motors through a rheostatic device that is actuated by a torque-responsive mechanism to vary the speed of the motors by automatically varying resistance in accordance with variations in the torque characteristics of the drill member.

In my copending application, Serial No. 70,686, filed November 21, 1925, I have described an earth-boring system embodying a plurality of reciprocating engines and a plural differential-gear mechanism having a torque device associated therewith for coordinating the drilling function of the work member with the operating characteristics of the engines, so as to obtain an automatic regulation of the throttles of the engine members, to regulate the speed thereof for the purpose of obtaining a balanced and automatically regulated earth-boring device.

My present invention distinguishes from the aforementioned application in that I utilize a pair of electric motors for actuating the drilling mechanism, and in the provision of means for associating the torque-indicating device with a motor-control or regulating system to effect automatic regulation of the speed of the motors responsive to the torque variations of the drill member.

In the accompanying drawing, constituting a part hereof and in which like reference characters designate like parts, the single figure represents a diagrammatic view of an earth-boring system embodying the principles of my invention.

Referring to the drawing, the reference numeral 1 designates a rotary drill table having a drive shaft 2 connected by a sprocket 3 to a sprocket 4 comprising one side of a differential gear mechanism 5, which is mounted on a line shaft 6, together with another differential gear mechanism 7 that is secured to said shaft to rotate therewith. The differential mechanisms 5 and 7 are associated with sprockets 4, 8 and 9, which respectively constitute integral parts of sun gear-wheels 10, 11 and 11a, and 12. The inner sun gear-wheels 11 and 11a of the respective differential mechanisms are thus rigidly secured together.

The line shaft 6 is provided at its respective ends with cat-heads 13 that are utilized for minor hoisting operations, such as raising or lowering sections of the drill pipe or for hoisting accessories around the derrick floor. A sprocket 14 is provided on the line shaft 6 and is adapted to be cooperatively connected to a sprocket 15, which is rotatably journaled on a drum shaft 16 and is adapted to rotate the latter through the medium of a clutch member 17. A hoist drum 18 is carried by the shaft 16, this drum being provided with a cable 19 that feeds the drill stem towards or away from the work, in accordance with a familiar practice.

The planetary system of the differential gear mechanism 5 is provided with a sprocket 20 that is operatively connected to a sprocket 21. The sprocket 21 is rotatably journaled on a torsion shaft 22 which is adapted to rotate through the medium of a splined clutch 23. The torsion shaft 22 is provided with a weighted torque arm 24, which regulates the torque on the drill table 1 in the manner hereinafter set forth.

The sprockets 8 and 9 of the line shaft 6 are cooperatively engaged with sprockets 25 and 26, respectively, which are actuated through a pair of reduction gear trains 27 and 28 by electrical motors 29 and 30, respectively.

The motors are electrically connected to a rheostat 31 having a contact arm 32 that is connected by a suitable link 33 to the torque arm 24. The electrical circuits of the motors are completed through a pair of drum type controllers 34 and 35 to a supply circuit 40, as shown. It will be understood that any other suitable motors and circuits may be employed, if desired.

The rheostat 31 comprises resistors 36 and 37 having buttons 38 for making contact with the arm 32 as the latter is actuated about its pivot 39.

The operation of my device is briefly as follows. The motors 29 and 30 are energized to effect rotation of the sprockets 25 and 26 in opposite directions, thus rotating the sprockets 8 and 9 in opposite directions at such speeds as will produce a differentiation through the differential mechanism 7, to rotate the line shaft 6 in the proper direction of rotation for feeding the cable 19 in the direction in which the drill member is fed, that is, downwardly.

The sprocket 8 is formed integrally with the sun gear-wheels 11 and 11a of the differential gear mechanisms 5 and 7 and, since the planetary gear-wheels of the differential device 5 are restrained against rotary movement by virtue of the connection of sprocket 20 to sprocket 21 of the torsion shaft 22, (clutch 23 being closed) a torque will be transmitted through these planetary gear-wheels to the sun gear-wheel 10 of sprocket 4 and thence to sprocket 3, thereby effecting the rotation of the drive shaft 2 of the rotary drill member 1.

The amount of torque transmitted from the motors 29 and 30 through the differential mechanism 5 is dependent upon the weight of the torque arm 24, which is designed to be such as will provide a maximum torque on the drill table within safe working limits of the drill member.

As explained in detail in my copending application, previously referred to, the torque arm 24 does not rotate, but may oscillate within a limited angular range, in accordance with load conditions, and such movement is transmitted by the link 33 to the contact arm 32 of the rheostat 31. The angular movement of the contact arm 32 varies the resistors 36 and 37, thereby reducing the speed of one motor and increasing the speed of the other, in such manner as to vary the torque on the differential mechanisms and the drill table in accordance with the increasing or decreasing resistance encountered by the drill bit.

Where it is desired to utilize the hoist drum 18 for hoisting operations, independently of the operation of the drill table 1, the clutch 23 is disengaged from the sprocket 21 and the latter is permitted to idly rotate on the torsion shaft 22, which permits a free rotation of the planetary gear-wheels of the differential mechanism 5. Consequently, no torque is transmitted to the sun gear-wheel 10, which remains idle by virtue of the static frictional resistance of the rotary table 1, to which the sprocket 4 is connected.

The proper operating speeds of the motors may thus be utilized for the rapid hoisting operations involving the drum member 18, or for the auxiliary hoisting operations carried on by the line shaft 6 and the cat-heads 13.

It is evident from the foregoing description of my invention that a system organized in accordance therewith provides an efficient means for conducting earth-boring operations, or the like, entirely automatically; that is, with automatic regulation of the torque input and automatic feeding of the drill member, through the control effected by the torque device and speed-regulating mechanisms that are associated with the prime mover.

Although I have described a specific embodiment of my invention, as applied to earth-boring operations, it will be obvious to those skilled in the art that various modifications may be made in the details of construction and in the arrangement of the several cooperating parts without departing from the principles herein set forth.

I claim as my invention:

1. In an earth-boring system, in combination, a rotary table for rotating a boring tool, a hoist drum and cable for supporting the tool, a plurality of electrical motors for operating the rotary table and hoist drum, a source of electrical energy for the motors, driving connections interposed between the motors and the rotary table and hoist, comprising a plurality of differential mechanisms carried by a common shaft, said mechanisms comprising planetary elements and sun gears, the planetary element of the one being operatively connected to the common shaft, the planetary element of the second differential mechanism being rotatably mounted on said common shaft, means for resiliently confining the movement of said second planetary element within predetermined limits in response to the load on the rotary table and means disposed to be actuated by said last named means for controlling the supply of electric current to the driving motors to institute a hoisting operation and thereby prevent excessive torque from being applied to the drilling tool.

2. In an earth-boring system, in combination, a rotary table for rotating a boring tool, a hoist drum and cable for supporting the tool, a plurality of electrical motors for operating the rotary table and hoist drum, a source of electrical energy for the motors, driving connections between the motors and the drill table and hoist drum comprising a plurality of differential mechanisms associated with a common shaft and each comprising a floating portion, the floating portion of one differential being operatively connected to the common shaft and the floating portion of the second being freely rotatable thereon, and operatively connected to the hoist drum and means for restricting the movement of the freely rotatable floating portion of the second differential to control the supply of current to the motors to permit a predetermined torque to be transmitted from the driving motors to the rotary table.

3. A transmission mechanism comprising a driven member, a feed mechanism for the driven member, a torque responsive device for measuring the total torque exerted upon the driven member, two motors for driving the driven member, a source of electrical energy for the motors, a differential mechanism for transmitting power from the two motors to the driven member and for communicating the torque of one motor to the feed mechanism, said torque responsive device being disposed to regulate the proportion of the torque supplied by each of the motors by controlling the supply of current to them.

4. In an earth-boring system, in combination, a driven element, an electrical motor for driving said element, a source of electrical energy, a feed mechanism for the driven element, a differential mechanism interposed between the motor and the driven element and operatively connected to the feed mechanism, whereby the power of the motor is transmitted to the driven element and the reaction torque of the differential mechanism is utilized to operate the feed mechanism, a second electrical motor interposed between the differential mechanism and the driven element for assisting the first named motor, a second differential interposed between the two driving motors and the driven element and means associated with the second differential mechanism for adjusting the ratio of the current supplied to the two motors to thereby regulate the torque of the first named motor and consequently the torque exerted upon the feed mechanism to regulate the feed in such manner that the total torque applied to the driven element will be maintained substantially constant.

5. A boring mechanism comprising a driven element, a feed mechanism for the driven element, two motors for driving the driven element, a source of electrical energy for the motors, a torque responsive device interposed between the two motors and the driven element, a differential mechanism interposed between one of the motors and the driven element, through which substantially all of the power of said motor is transmitted to the driven element and the reaction torque thereof is utilized to operate the feed mechanism, and means connected to the torque responsive device for varying the ratio of current input to the two motors in accordance with the total torque exerted upon the driven element to thereby regulate the torque exerted by one of the motors upon the feed mechanism to maintain substantially constant boring pressure.

6. In an earth-boring system, the combination with a drilling mechanism, of a differential mechanism, comprising three elements for transmitting power to the drilling mechanism, two electrical motors for driving the differential mechanism, one of said motors being connected to one element of the differential mechanism, and the other motor being connected to a second element of the differential mechanism, a feed mechanism operatively connected to a third element of the differential mechanism in such manner that it is normally responsive to the torque of one of the driving motors, said third element of the differential mechanism being disposed to transmit power from said first element to the second element of the differential mechanism, means for transmitting the sum of the power of the two motors from the second element of the differential mechanism to the drilling mechanism, said transmission means comprising a torque responsive device, and means operatively connected to the torque responsive device for controlling the supply of current to the motors to regulate the proportion of the total power supplied by each of the motors.

7. In a transmission system, the combination with two motors and a source of electrical energy for the motors, of a differential mechanism, two elements of which are each independently driven by one of the motors, a feed mechanism operatively connected to the third element of said differential mechanism, a torque responsive device operatively connected to one of the said motor driven elements, a driven member operatively connected to said last named element through said torque responsive device, and a current-regulating mechanism operatively connected to said torque responsive device for adjusting the torque ratio of said motors.

In testimony whereof, I have hereunto subscribed my name this 2nd day of February, 1926.

FREDERIC W. HILD.